No. 839,941. PATENTED JAN. 1, 1907.
A. LUTZE.
MACHINE FOR MOLDING PLASTIC MATERIALS.
APPLICATION FILED JAN. 13, 1906.

Witnesses
Inventor
Alfred Lutze
by his Attorney

No. 839,941. PATENTED JAN. 1, 1907.
A. LUTZE.
MACHINE FOR MOLDING PLASTIC MATERIALS.
APPLICATION FILED JAN. 13, 1906.

Witnesses
O. Haddan
S. Ford

Inventor
Alfred Lutze
by his Attorney R. Haddan

No. 839,941. PATENTED JAN. 1, 1907.
A. LUTZE.
MACHINE FOR MOLDING PLASTIC MATERIALS.
APPLICATION FILED JAN. 13, 1906.

Witnesses
A. J. Hadden
S. Ford

Inventor
Alfred Lutze
by his Attorney R. H. Hadden

No. 839,941. PATENTED JAN. 1, 1907.
A. LUTZE.
MACHINE FOR MOLDING PLASTIC MATERIALS.
APPLICATION FILED JAN. 13, 1906.

Witnesses

Inventor
Alfred Lutze
by his Attorney

No. 839,941. PATENTED JAN. 1, 1907.
A. LUTZE.
MACHINE FOR MOLDING PLASTIC MATERIALS.
APPLICATION FILED JAN. 13, 1906.

Witnesses
Inventor
Alfred Lutze
by his Attorney

No. 839,941. PATENTED JAN. 1, 1907.
A. LUTZE.
MACHINE FOR MOLDING PLASTIC MATERIALS.
APPLICATION FILED JAN. 13, 1906.

Witnesses
A. J. Haddan
A. E. Hathaway

Inventor
A. Lutze
Attorney
By R. Haddan

UNITED STATES PATENT OFFICE.

ALFRED LUTZE, OF HALLE-ON-THE-SAALE, GERMANY.

MACHINE FOR MOLDING PLASTIC MATERIALS.

No. 839,941.  Specification of Letters Patent.  Patented Jan. 1, 1907.

Application filed January 13, 1906. Serial No. 295,939.

*To all whom it may concern:*

Be it known that I, ALFRED LUTZE, a subject of the German Emperor, residing at Halle-on-the-Saale, Germany, have invented certain new and useful Improvements in Machines for Molding Plastic Materials, of which the following is a specification.

The present invention relates to that class of molding-machines for plastic materials in which the material placed in the cylindrical casing of the machine is driven through an aperture in said casing or pressed into a mold arranged in front of said aperture, the material being driven by means of a rotary-vane mechanism arranged in said casing or by means of a worm assisted by a movable part actuated by a weighted lever, the pieces being then cut by a cutting device and completely molded, whereupon they are removed from the mold or molds by a plunger.

The novelty of the present invention lies chiefly in the fact that the mold and plunger forming the bottom thereof are arranged in a drum-shaped casing, the operation of the drum being produced by means of a toothed sector, and between the gear for the plunger a coupling mechanism is interposed, which by a locking device and controlling-gear acting thereon, is connected to a movable two-part stop-block acted on by the weighted lever and one part of said block being connected to the main driving-gear in such a manner or in such coöperation that when there is sufficient material in the casing and said material has not received the necessary compression in the mold the drum is caused to revolve periodically; but the part of the block operated by the main gear in common with the controlling and the locking device prevents the coupling of the secondary gear with the driving-shaft for the plunger, and the action of the latter is therefore stopped, whereas if the material is compressed to the limit determined by the weighted lever the stop-block, which insures the degree of compression of the material, is moved backward and disengages the intermediate member inserted between it and the controlling mechanism, so that the locking device is therefore not operated and allows the coupling of the plunger-operating mechanism, whereupon the drum and plunger are periodically rotated or moved in such a manner that during one revolution of the drum the mold is filled, and the completely-molded piece is forced out of said drum, the plunger during the filling of the mold being withdrawn into the latter and effecting a suctional action on the material, whereas after filling the rotation of the drum causes the superfluous material to be removed from the mold by means of a knife operated by the drum for the purpose of obtaining pieces of uniform size and weight.

The improved machine is shown in the annexed drawings, in which—

Figure 1:
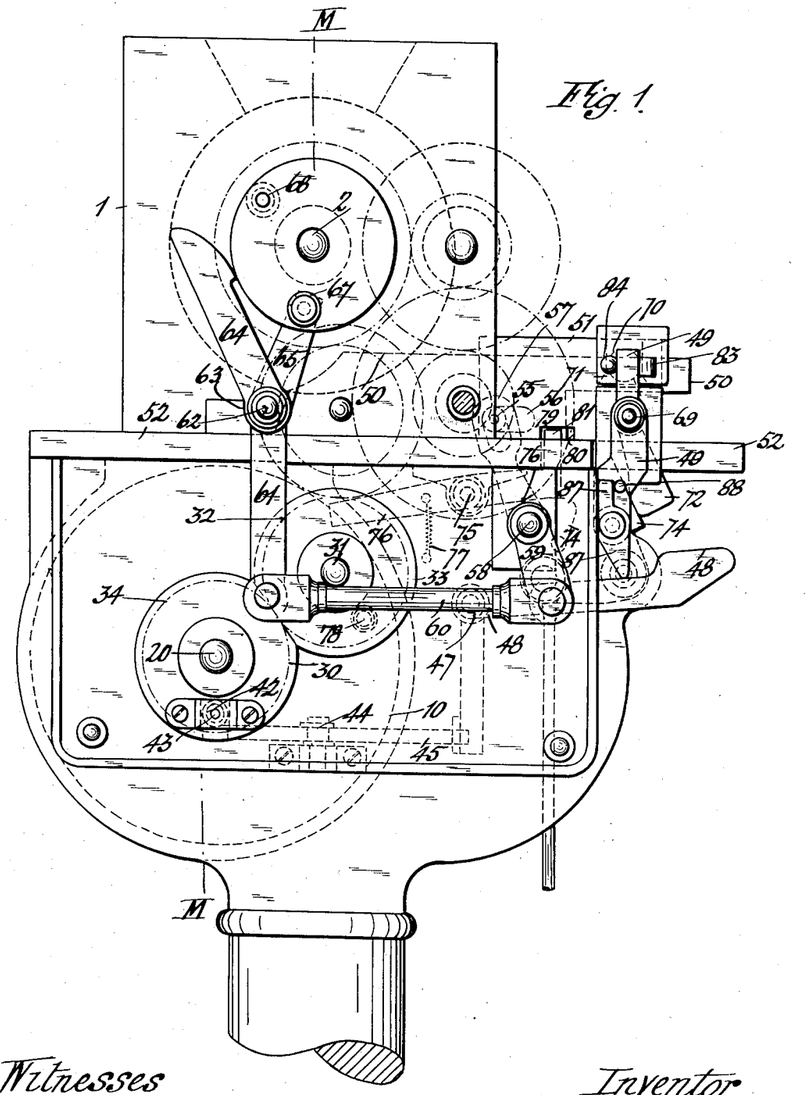
Figure 1 is a front elevation of the main gear.
Figures 2, 7, 8, 9:
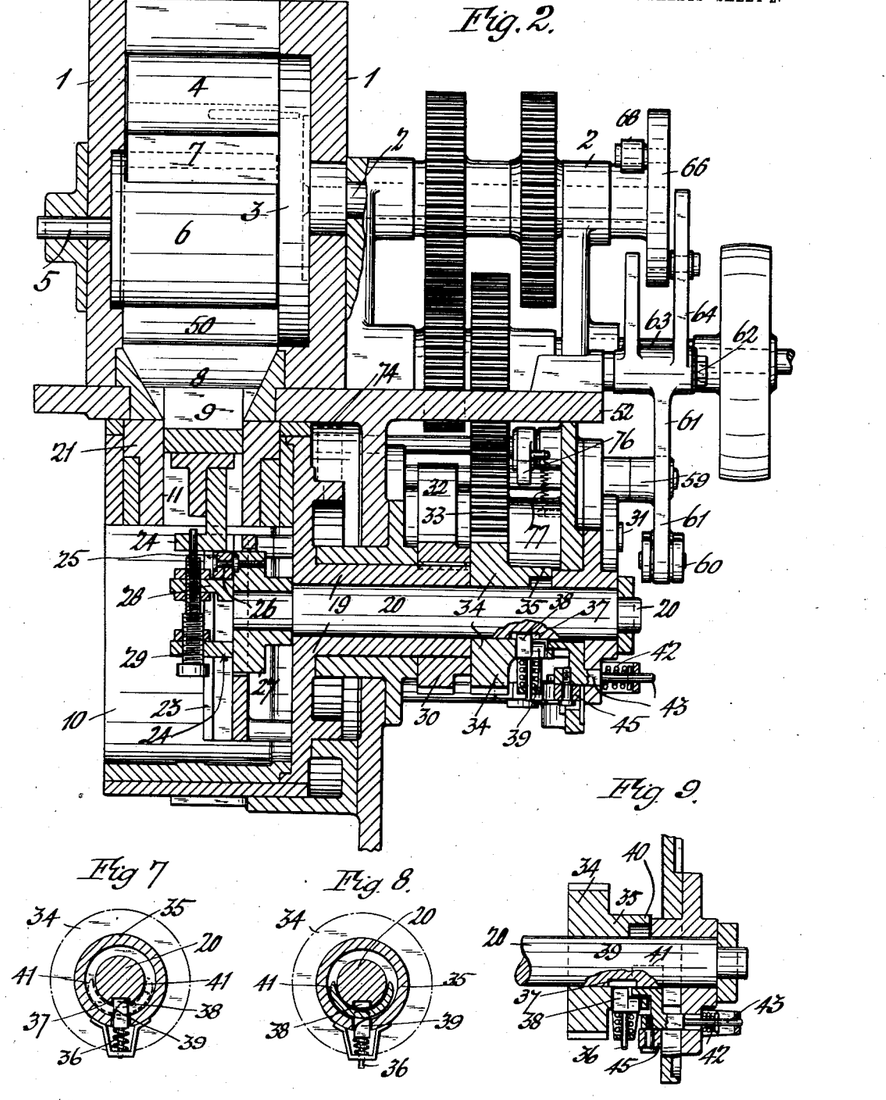
Fig. 2, a vertical section on the line M M of Fig. 1.
Figs. 6 to 16 show details.
Figure 3:
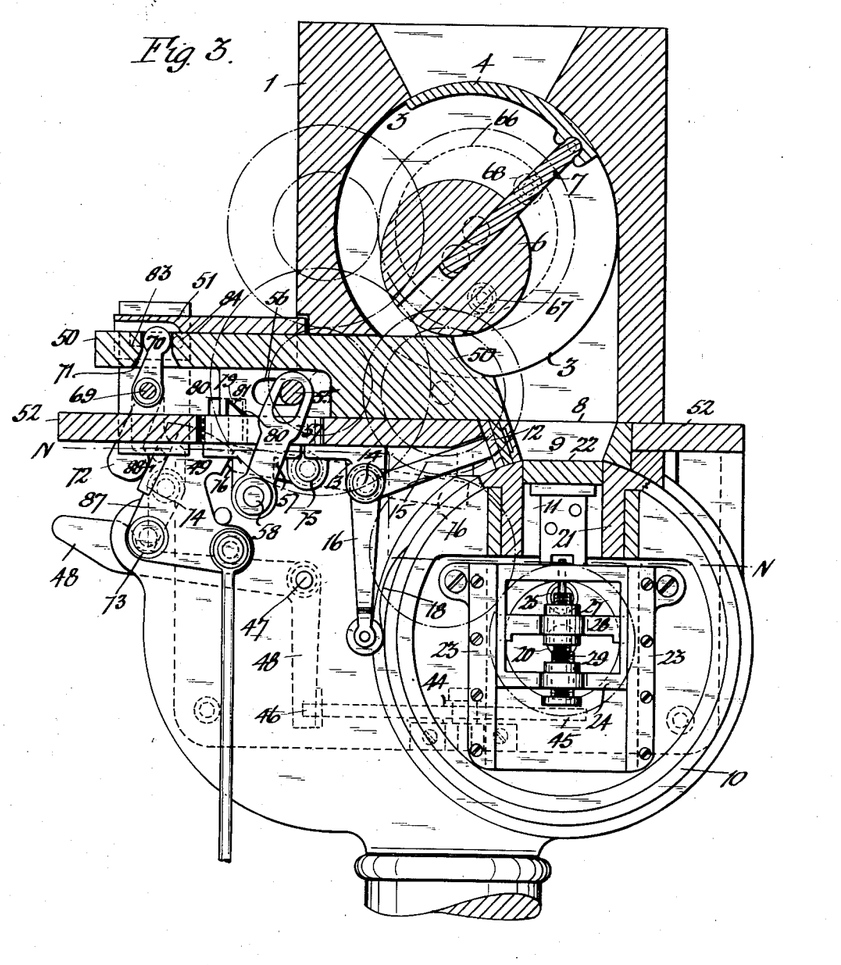
Fig. 3, a rear view of the machine, partly in section.

In the cylindrical casing or chamber 1 is a shaft 2, extending laterally into said casing and carrying a disk 3, Figs. 1, 2, and 3, actuated by gear at a suitable speed. Close to the outer edge of said disk 3 is located a wall 4, extending across the whole interior width of the casing, and in the hollowed front end of said wall is supported a vane 7 by means of a ball-joint, said vane being guided in a roller 6, eccentrically supported by means of a pivot 5, by means of which vane, on revolution of the disk 3, the material fed into the casing is driven through a nozzle 9, in communication with a discharge-aperture 8 in the bottom of the casing 1 and forced into the mold 11, carried by a rotary drum 10. In one side wall of the nozzle 9 is an inclined knife 12, as shown in Fig. 3, said knife being connected to the rotary drum by means of a bell-crank lever or by levers 15 16 and roller 17, fixed to a pivot 14, mounted in bearings 13, and at a certain time actuated by a cam-surface 18 on the drum, which acts on the roller 17 and levers 15 16, so that during the passage of the mold 11 below the knife 12 the superfluous material is removed from the mold in a straight line.

The drum 10, Fig. 2, is surrounded by a jacket fixed to the machine-frame and is rotatable about a shaft 20 by means of a long hub 19. The drum carries the mold 11 in a segment 21, the bottom of said mold being formed by a movable plunger 22, which is connected to a frame 24, guided between bars 23. Between parts of the frame 24 engages the pin 26, carrying a roller 25, said pin being mounted on a crank-disk 27, fixed on the shaft 20, so that on rotation of said disk the frame 24 is displaced between the guides 23 and the plunger 22 moved upward or downward in the mold 11.

In the frame 24 is loosely inserted a cross-bar 28, Figs. 2 and 3, adapted to be displaced with regard to the crank-disk 27 by means of a screw-spindle 29, so that the plunger 22 is caused to make a longer or shorter stroke. As the plunger 22 closes the mold 11 at one end and the stroke to be made thereby can be adjusted by the means just described the effective capacity of the mold can be regulated as desired at any time. On the hub 19 of the drum 10 is mounted a toothed wheel 30, with which is caused to temporarily engage a toothed sector 32, mounted on a shaft 31, continuously revolving during the action of the machine and driven from the main driving-gear in the proportion of one to two. This sector causes an intermittent revolution of the drum 10. On the said shaft 31 is also mounted a toothed wheel 33, meshing with a toothed wheel 34, loosely mounted on the shaft 20. The latter toothed wheel is provided with an elongated hub 35, Figs. 7, 8, and 9, in which is a spring-pressed catch 36, which engages a notch 37 on the shaft 20, and has in addition to the engaging tooth 38 proper a shorter curved or wedge-shaped projection 39, which on engagement of the tooth 38 in the notch in the shaft 30 bears against the latter. The hub of the toothed wheel 34 is provided at its end with an annular projection 40, into the path of which the wedge-like projection 39 of the catch extends. In front of the hub 35 there is arranged a crescent-shaped slide 41, adapted to fit into the annular space between the shaft 20 and the projection 40, said slide being acted on by a spring 42 and connected to a pin 43, loosely guided in the wall of the frame. The purpose of this slide is to prevent the coupling of the gear-wheel 34 with the shaft 20 if the chamber is insufficiently filled with material. For this purpose the slide is connected with a double-armed lever 45, pivotally connected to the frame at 44, and the nose-shaped end 46 of the said lever is adapted to be operated by a bell-crank lever 48, mounted on an axle 47. For operating the lever 48 a lever 49 is pivotally connected with the stop-block before referred to. The latter comprises two relatively movable parts 50 and 51. The part 50 extends through an aperture into the casing 1, and thus normally shuts off the space between the roller 6 and the aperture 8, Fig. 3. The shaft 2 and disk 3 being rotated in anticlockwise direction, the vane 7 presses the plastic mass in the chamber 1 against the block 50, projecting into the said chamber. The part 51 is slidable on the table 52, which is enlarged on the side in question.

The parts 50 and 51 are connected with each other by means of a pin 55, the part 50 being allowed a certain amount of free movement by means of a slot 56. A lever 57 is loosely mounted on the pin 55 and connected with a rod 60 by means of a transverse shaft 58 and an arm 59, fixed thereto.

The rod 60 is connected by an arm 61 with a sleeve 63, rotatable on a gudgeon 62, two upwardly-directed cams 64 and 65 being fixed to said sleeve at a suitable distance apart, so that a disk 66, mounted on the shaft 2, extends between said cams, said disk being provided with lateral rollers 67 and 68, Figs. 1 and 2. During the rotation of the shaft 2 the inner surfaces of the cams 64 and 65 alternately abut against said rollers, and thus cause the arm 61 to oscillate. The oscillatory movement of the said arm is transmitted, by means of the mechanism described, to the lever 57, so that the parts 50 and 51 are positively reciprocated.

At the rear of the slidable part 51 an axle 69 is mounted, and a finger 70, fixed to said axle in the central part of the slide, engages a recess 71 in the part 50. To one end of the axle 69 there is fixed an arm 72, which when the block is pushed inward abuts against a plate 74, pivoted at 73.

Figure 4:
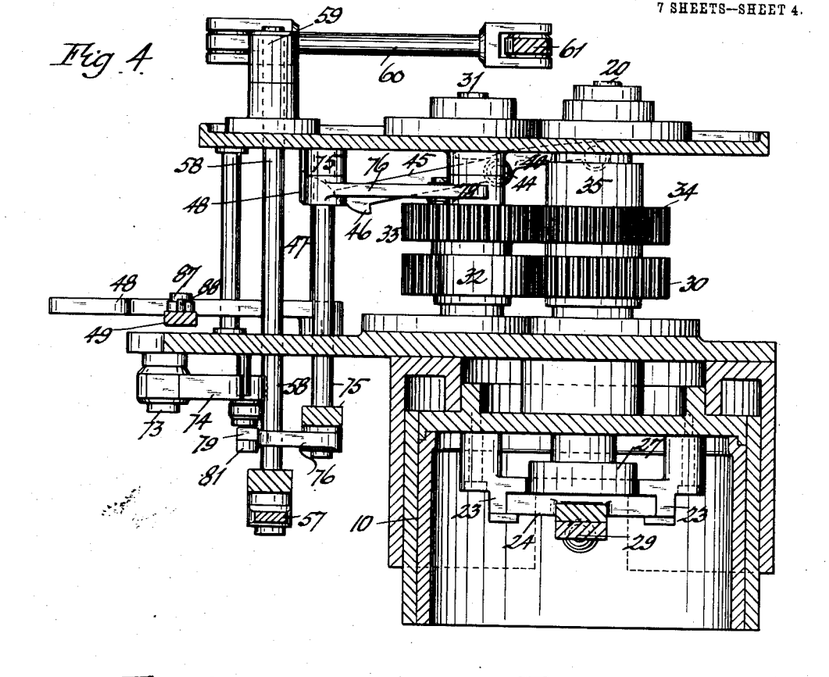
Fig. 4, a horizontal section on the line N N of Fig. 3, and Fig. 5 a front view of Fig. 3.
Figure 5:
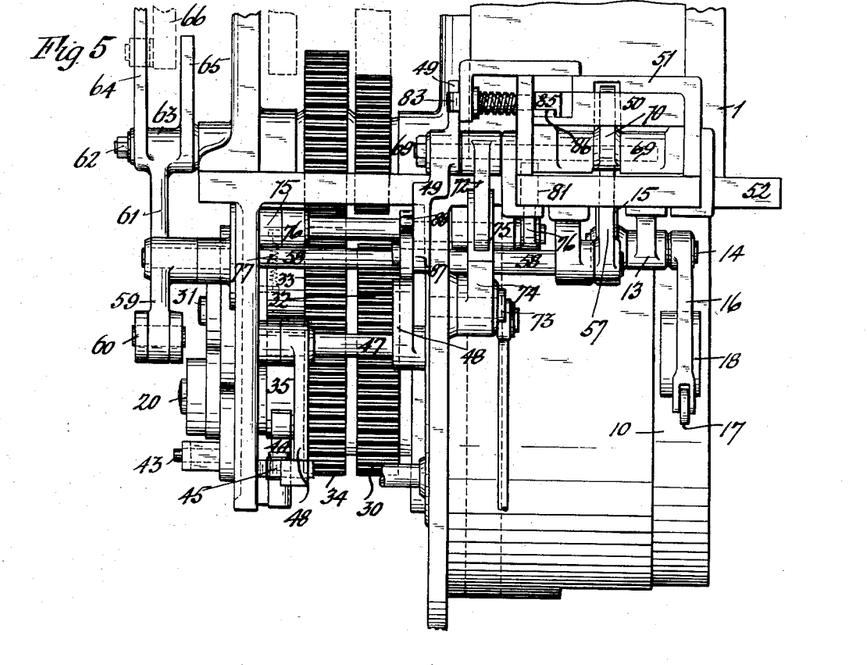

The plate 74 is provided at its lower part with a projecting eye 100, engaged by a rod 101, connected to a double-armed weighted lever 103, fulcrumed at 102 on a pillar of the machine-frame. This lever 103 forces the plate 74 against an abutment 104, and thus exerts pressure on the block 50 by means abutting against the arm 72. Below the block 50 a double-armed lever 76 is fulcrumed at 75 on the machine-frame, one end of the said lever being bent upward at a right angle to pass through a slot provided in the table 52. The upper end of the upwardly-bent part of the lever 76 is provided with a tooth 79 and a wedge-like projection 81, the former engaging a recess 80 in the part 51 and the latter a recess 82 in the slide 50. One wall of the recess 82 is inclined. A spring 77 acting on the lever 76 tends to press the parts 79 and 81 into the recesses 80 and 82 and to place the other end of the said lever in the path of a roller 78, connected to the side of the toothed wheel 33, Figs. 1 and 4, so that during the rotation of the latter the roller actuates the lever 76 and disengages the parts 79 and 81 from the recesses 80 and 82 in order that the slides 50 and 51 can be reciprocated by means of the levers 64, 65, 61, 60, 59, and 57, operated by the disk 66, the coupling of the main driving mechanism with the auxiliary mechanism being prevented by the lever 49, which is connected to the part 51 by means of a resiliently-supported pin 83 and an abutment 84 and which coöperates with the lever 48.

Figure 6:
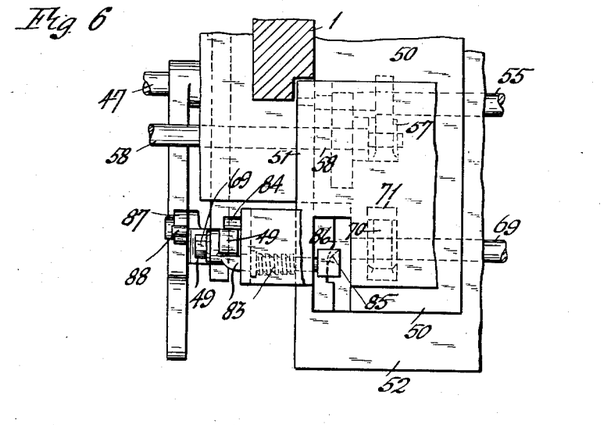
Figures 15, 16:
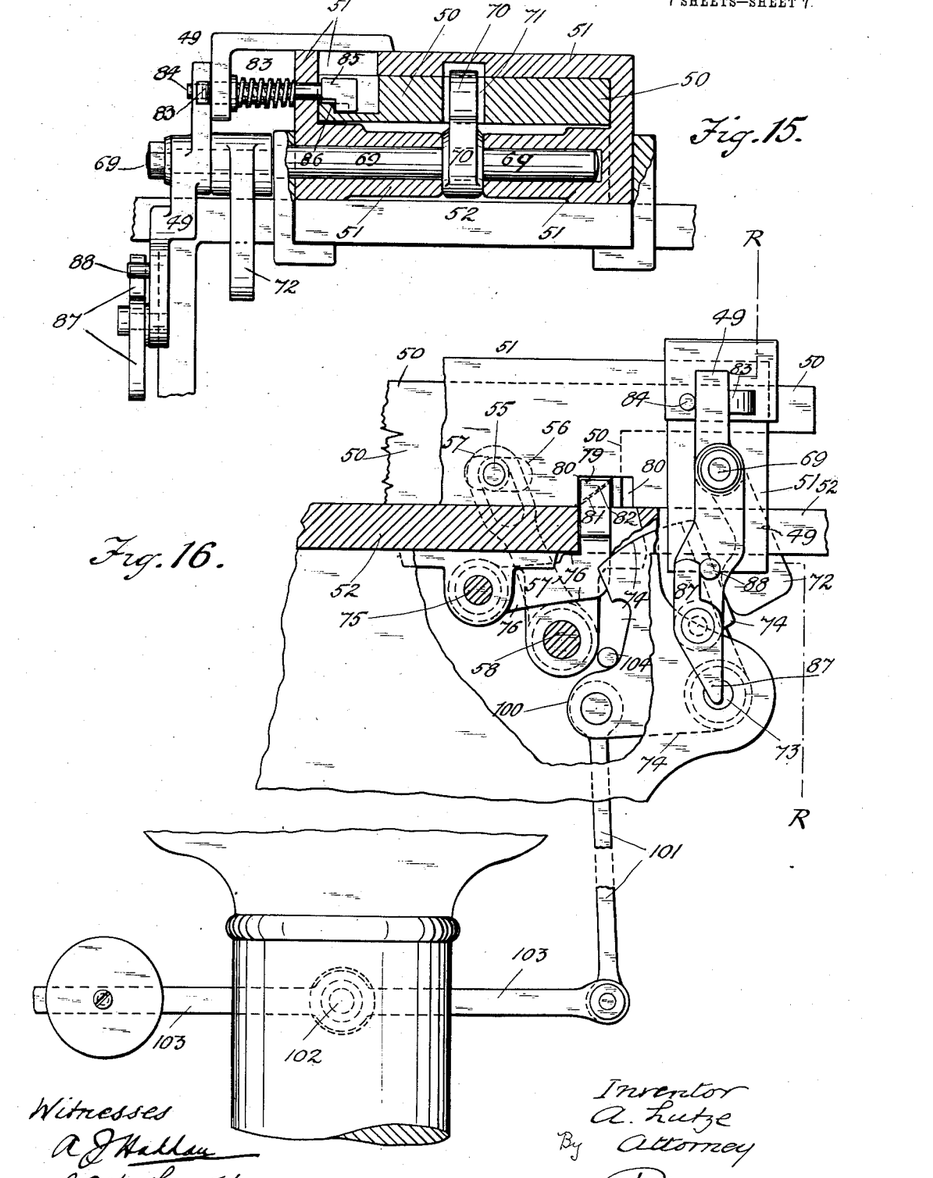

If before the lever mechanism is started the accumulation of plastic mass in the chamber 1 causes a certain pressure to be exerted on the slide 50, the latter is pushed out of the chamber, the force of gravity acting on the weighted lever being overcome. During this movement of the part 50 the inclined wall of the recess 82, coöperating with the projection 81, causes the tooth 79 to be disengaged from the part 51, and thus releases the lever 49, a wedge-like projection 86 of the slide 50, Figs. 6 and 15, coöperating with the head 85 of the pin 83 to withdraw the latter from the said lever. The continued movement of the slide 50 causes the slide 51 to be displaced by the pin 55, the lever 49 being thus rocked without actuating the lever 48, so that slide 41 remains disengaged and the catch 36 on the hub 35 of the toothed wheel 34 can engage the shaft 20. To the lower end of said lever 49 is connected a movable double cam 87, the movement of which in one direction is limited by an abutment 88, whereas the said cam is freely movable in the opposite direction.

The action of the machine is as follows: So long as the casing does not contain a sufficient quantity of material or so long as the latter has not been compressed to the proper density by the parts 6 and 7, only the drum 10 revolves, together with the disk 3, and the parts 6 and 7 are operated. The block 50 51 is also horizontally and positively reciprocated by means of mechanisms 66, 67, 68, 64, 65, 61, 60, 59, 58, and 57. The lever 49 also takes part in this movement, and since the upper end thereof is held fast by the pin 83 and abutment 88 the said pin 83, during each return movement of the slide or stop-block, exerts pressure on the bell-crank lever 48, and thus rocks the latter, the rocking end of the lever 48 acting in such a manner on the nose-shaped end 46 of the lever 45 that the slide 41, connected with the latter, is pushed between the hub part 40 and the shaft 20, and the catch 36, connected with the toothed wheel 34, is thus prevented from engaging the notch 37 in the shaft 20. The latter and the plunger 22 in the mold therefore remain stationary. During the forward movement of the slide 51 the cam 87 is reversed and does not actuate the lever 48, and the lever 76, locking the slide 51, is disengaged by the roller 78 of the toothed wheel 33, the disengagement taking place a short time before the displacement of the slide takes place. As soon as there is sufficient material in the casing or chamber 1 and when the said material has been compressed to the extent determined by means of the weighted lever the pressure due to the material moves the part 50 toward the rear, so that the inclined surface of the recess 82 disengages the lever 76 from the recess 80 in the slide 51, and the tooth 86, acting on the projection 85 of the pin 83, causes the latter to be withdrawn, and thus releases the lever 49. When during the further movement of the part 50 the lever 49 abuts against the lever 48, the former merely rotates about its pivot without actuating the levers 48 and 45, so that the slide 41 remains disengaged and the catch 36 on the hub 35 of the toothed wheel 34 can engage the shaft 20. Thereupon the drum 10 and plunger 22 are intermittently so operated that during each revolution of the drum the mold 11 is filled and the contents thereof removed from the latter.

With the parts in the positions shown in Figs. 1 to 3 the mold 11 is below the discharge-aperture 8 of the chamber 1, and the sector 32 is disengaged from the driving-wheel 30, so that the drum 10 remains stationary. Thereupon the action of the crank-disk 27 on the frame 24 causes the plunger 22 to be withdrawn into the mold and to produce a suctional effect by which the material acted on by the parts 6 and 7 is, as it were, drawn into the mold. The plunger then becomes stationary after entering into the mold to a predetermined extent and the mold is charged. Meanwhile the sector 32 engages the wheel 30, and the drum 10 is rotated. The cam-surface 18 on the latter thereupon acts on the knife 12 by means of the roller 17 and levers 15 and 16, so that the excess of material is cut away from the mold moving below it. After one half-revolution of the drum the sector 32 is disengaged from the wheel 30, and the crank-disk 27 thereupon immediately moves the frame 24 and plunger 22 downward, so that the molded material is moved through an aperture in the wall of the jacket surrounding the drum 10. After the next engagement of the sector 32 with the wheel 30 the drum is rotated through a further one hundred and eighty degrees, so that the mold is again moved underneath the discharge-aperture and the operation described is repeated so long as the chamber 1 contains sufficient material, which is subjected to the pressure determined by means of the weighted lever.

As has already been mentioned, the part 50 checks the material actuated by the vane 7 and does not yield until a certain amount of compression has been effected. The material pressed into the mold is therefore not only uniformly compressed, but remains in the state of compression imparted to it, since it cannot recede. It follows from this that the molded bodies produced are uniform in weight and size.

Figure 10:
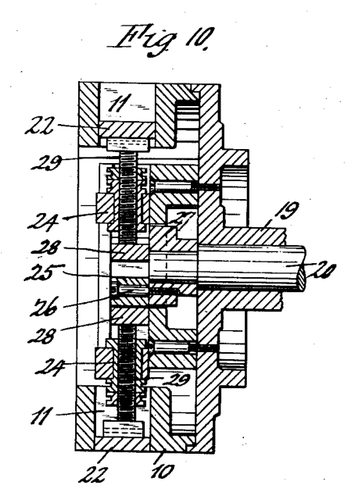
Figure 11:
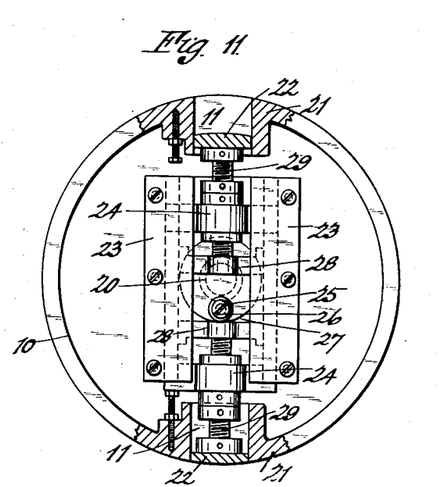
Figure 12:
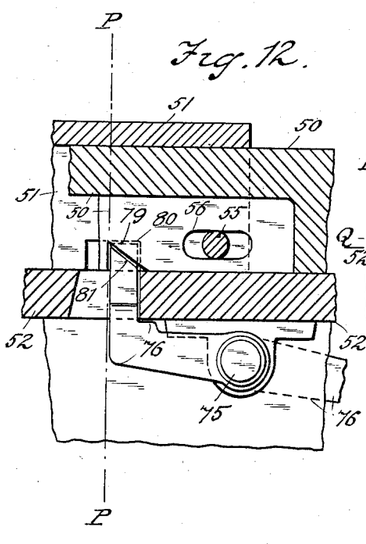
Figure 13:
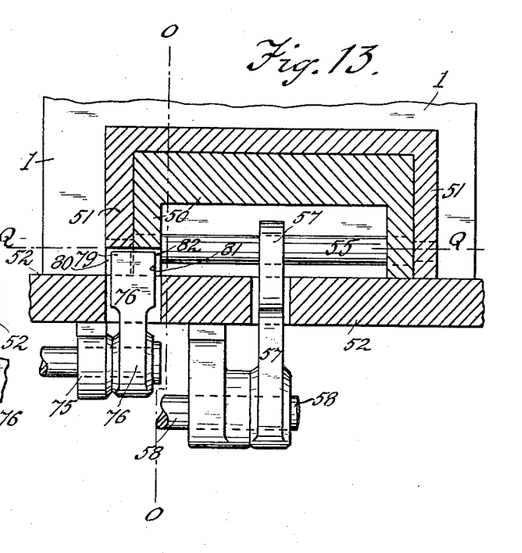
Figure 14:
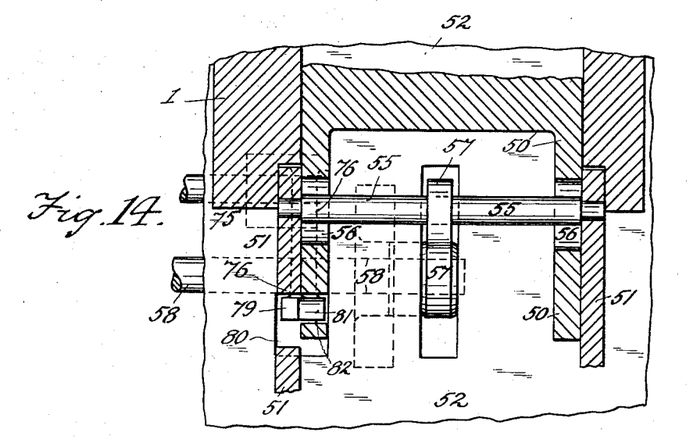

To increase the efficiency of the machine, the drum 10 can be provided with two molds 11 and plungers 22, as shown in Figs. 10 and 11. In this case the frame 24 is provided with two loose cross-bars 28, and each plunger has a separate screw-spindle, so that the depth to which the molds are filled can be exactly controlled.

What I claim as my invention, and desire to secure by Letters Patent of the United States, is—

1. In a machine for molding plastic materials the combination of a feed-chamber having a discharge-aperture means for compressing the material in said chamber and forcing same toward the discharge-aperture, a mold in communication with said discharge-aperture, a rotatable drum carrying said mold and having an outlet, a reciprocating plunger in said mold forming the bottom thereof, mechanism for reciprocating said plunger and means for putting said plunger-reciprocating mechanism into and out of action for the purpose set forth.

2. In a machine for molding plastic materials, the combination of a feed-chamber having a discharge-aperture, means for compressing the material in said chamber and forcing same toward the discharge-aperture, a mold in communication with said discharge-aperture, a rotatable drum carrying said mold and having an outlet, a reciprocating plunger in the mold forming the bottom thereof, a reciprocatable block controlled by a weight and extending into the feed-chamber, mechanism for periodically rotating the drum, mechanism for reciprocating the plunger and means in connection with the block aforesaid for putting said plunger-reciprocating mechanism into and out of action for the purpose set forth.

3. In a machine for molding plastic materials the combination of a feed-chamber having a discharge-aperture, means for compressing the material in said chamber and forcing same toward the discharge-aperture, a mold in communication with said discharge-aperture, a rotatable drum carrying said mold and having an outlet, a reciprocating plunger in the molds forming the bottom thereof, a reciprocatable block controlled by a weight and extending into the feed-chamber, mechanism for periodically rotating the drum mechanisms for reciprocating the plunger, means in connection with the block aforesaid for putting said plunger-reciprocating mechanism into and out of action and means for locking said block at intervals substantially as described.

4. In a machine for molding plastic materials the combination of a feed-chamber having a discharge-aperture, means for compressing the material in said chamber and forcing same toward the discharge-aperture, a mold in communication with said discharge-aperture, a rotatable drum carrying said mold and having an outlet, a reciprocating plunger in said mold forming the bottom thereof, a reciprocatable block controlled by a weight and extending into said feed-chamber, mechanism for periodically rotating the mold-drum, mechanism for reciprocating the plunger, means in connection with the block aforesaid for putting said plunger-reciprocating mechanism into and out of action, means for locking said block at intervals and means for removing superfluous material from the mold substantially as described.

5. In a machine for molding plastic material the combination of a feed-chamber a bipartite reciprocatable weight-controlled block extending thereinto, a mold in communication with said feed-chamber a rotatable drum carrying said mold, means for periodically rotating said drum, a plunger within the mold and forming the hollow thereof, a crank-disk for reciprocating said plunger a shaft carrying said crank-disk and mechanism operated by the movement of the block for coupling and uncoupling said shaft for the purpose set forth.

6. In a machine for molding plastic material the combination of a feed-chamber a reciprocatable weight-controlled block extending thereinto, a mold in communication with said feed-chamber, a rotatable drum carrying said mold, means for periodically rotating said drum, a plunger within the mold and forming the bottom thereof, a crank-disk for reciprocating said plunger a shaft carrying said crank-disk and having a recess in its periphery, a spring-catch for engaging said recess, a crescent-shaped slide adapted to be interposed between said recess and catch to disconnect the latter, lever mechanism operated by the movement of the block for actuating said slide and a resilient pin and coacting abutment on the two parts of the block respectively for engaging said lever mechanism substantially as described.

7. In a machine for molding plastic material the combination with a feed-chamber a rotatable disk within the latter, rollers carried by said disk, a weight-controlled block extending into said chamber, a pin-and-slot connection between the two parts of said block, a plurality of cams acted upon by the rollers on the aforesaid disk and shaft and lever mechanism between the cams and block whereby the latter is reciprocated substantially as described.

8. In a machine for molding plastic material the combination of a block having a recess in its lower surface, a double-armed spring-pressed locking-lever adapted to engage said recess, a rotatable disk a roller on the latter adapted to actuate said lever against the action of the spring and an inclined plane on the block and coacting projection on the lever for releasing the latter on rearward movement of the block substantially as described.

9. In a machine for molding plastic material the combination of an intermittently-rotatable drum, a mold carried thereby and reciprocatable plunger within said mold, a cam-surface on the periphery of the drum a knife adapted to be moved across the mouth of the mold and a lever acted upon by said cam-surface on rotation of the drum to so move said knife substantially as described.

In witness whereof I have signed this specification in the presence of two witnesses.

ALFRED LUTZE.

Witnesses:
 MORITZ SPREER,
 RUDOLPH FRICKE.